(12) United States Patent
Dooley

(10) Patent No.: US 8,878,468 B2
(45) Date of Patent: Nov. 4, 2014

(54) ELECTRIC MACHINE ASSEMBLY WITH FAIL-SAFE ARRANGEMENT

(75) Inventor: Kevin Allan Dooley, Mississauga (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 262 days.

(21) Appl. No.: 13/097,268

(22) Filed: Apr. 29, 2011

(65) Prior Publication Data

US 2012/0275069 A1  Nov. 1, 2012

(51) Int. Cl.
*H02P 1/20* (2006.01)

(52) U.S. Cl.
USPC ....... 318/278; 318/366; 318/376; 318/400.21

(58) Field of Classification Search
USPC ............ 318/278, 379, 371, 432, 381, 400.06, 318/400.3, 400.21, 400.27, 375, 376, 366, 318/801; 361/78, 93.1, 87, 119, 33; 324/772
See application file for complete search history.

(56) References Cited

U.S. PATENT DOCUMENTS

| | | | |
|---|---|---|---|
| 2,226,952 A | 12/1939 | Smethurst | |
| 2,284,617 A | 10/1940 | Barney | |
| 2,432,276 A | 12/1947 | Boswau | |
| 2,874,337 A | 2/1959 | Sorensen | |
| 3,178,619 A | 4/1965 | Winchel | |
| 3,341,768 A | 9/1967 | Kelly | |
| 3,555,362 A * | 1/1971 | Quinn | 361/102 |
| 3,581,168 A * | 5/1971 | Kirkby | 318/759 |
| 3,599,069 A * | 8/1971 | Welch | 318/696 |
| 3,631,258 A | 12/1971 | Eisenstadt | |
| 3,678,353 A * | 7/1972 | Marchi | 318/762 |
| 3,789,282 A | 1/1974 | Harz | |
| 4,031,439 A | 6/1977 | Sakai et al. | |
| 4,152,634 A * | 5/1979 | Penrod | 318/739 |
| 4,271,380 A * | 6/1981 | Bradler et al. | 318/245 |
| 4,292,559 A * | 9/1981 | Auinger et al. | 310/206 |
| 4,426,606 A * | 1/1984 | Suita et al. | 318/375 |
| 4,543,524 A | 9/1985 | Bulley | |
| 4,626,698 A | 12/1986 | Harnden, Jr. et al. | |
| 4,698,577 A | 10/1987 | Seymour et al. | |

(Continued)

FOREIGN PATENT DOCUMENTS

| | | |
|---|---|---|
| JP | 63206186 | 8/1988 |
| WO | 2009/009232 | 1/2009 |

OTHER PUBLICATIONS

Cadirci et al.; "Effects of Instantaneous Power-Supply Failure on the Operation of Slip-Energy Recovery Drives"; IEEE Transactions on Energy Conversion [Online] 2005, vol. 20, Issue 1, pp. 7-15.

(Continued)

*Primary Examiner* — Paul Ip
(74) *Attorney, Agent, or Firm* — Norton Rose Fulbright Canada LLP

(57) ABSTRACT

An electric machine assembly with fail-safe arrangement is described. The assembly comprises a stator including a plurality of windings and a cooperating rotor including at least one permanent magnet; a detector configured to detect DC current in at least one of the windings of the stator; and a bypass circuit configured to be activated upon detection of the DC current by the detector and to prevent at least some of the DC current from flowing into the at least one of the windings of the stator.

19 Claims, 4 Drawing Sheets

(56) References Cited

U.S. PATENT DOCUMENTS

| | | | |
|---|---|---|---|
| 4,727,320 A * | 2/1988 | Brennan | 324/765.01 |
| 4,864,242 A | 9/1989 | Hurley | |
| 4,990,837 A * | 2/1991 | Ishitobi | 318/375 |
| 5,028,073 A * | 7/1991 | Harms et al. | 280/5.501 |
| 5,134,351 A * | 7/1992 | Msihid | 318/541 |
| 5,424,622 A * | 6/1995 | Keller et al. | 318/375 |
| 5,469,031 A * | 11/1995 | Chorey | 318/375 |
| 5,471,035 A * | 11/1995 | Holmes | 219/505 |
| 5,495,372 A * | 2/1996 | Bahlmann et al. | 360/75 |
| 5,710,494 A * | 1/1998 | Paweletz | 318/366 |
| 5,782,610 A * | 7/1998 | Ikeda | 417/53 |
| 5,816,358 A * | 10/1998 | Adler et al. | 180/279 |
| 5,831,410 A * | 11/1998 | Skibinski | 318/807 |
| 6,094,024 A * | 7/2000 | Westlake | 318/375 |
| 6,208,537 B1 * | 3/2001 | Skibinski et al. | 363/40 |
| 6,239,566 B1 * | 5/2001 | Tareilus et al. | 318/379 |
| 6,519,518 B1 * | 2/2003 | Klein et al. | 701/41 |
| 6,573,681 B2 * | 6/2003 | Schwesig | 318/801 |
| 6,628,101 B2 * | 9/2003 | Dymond et al. | 318/731 |
| 6,634,303 B1 | 10/2003 | Madsen et al. | |
| 6,653,806 B1 * | 11/2003 | Ono | 318/375 |
| 6,777,898 B2 * | 8/2004 | Peterson | 318/139 |
| 6,831,434 B2 | 12/2004 | Yoshihara | |
| 6,906,484 B1 | 6/2005 | Berroth et al. | |
| 6,956,751 B2 * | 10/2005 | Youm et al. | 363/37 |
| 6,965,206 B2 * | 11/2005 | Kamen et al. | 318/139 |
| 7,023,159 B2 * | 4/2006 | Gorti et al. | 318/432 |
| 7,071,645 B2 * | 7/2006 | Hahn et al. | 318/379 |
| 7,088,073 B2 * | 8/2006 | Morishita | 318/801 |
| 7,095,244 B1 * | 8/2006 | Chen | 324/765.01 |
| 7,102,264 B2 | 9/2006 | Yanashima et al. | |
| 7,110,272 B2 * | 9/2006 | Nojima | 363/56.03 |
| 7,170,245 B2 * | 1/2007 | Youm | 318/375 |
| 7,254,004 B2 * | 8/2007 | Mladenik et al. | 361/93.1 |
| 7,274,547 B2 * | 9/2007 | Al-Khayat et al. | 361/93.1 |
| 7,304,452 B2 * | 12/2007 | Nagai et al. | 318/811 |
| 7,342,763 B2 * | 3/2008 | Mladenik et al. | 361/119 |
| 7,352,550 B2 * | 4/2008 | Mladenik et al. | 361/87 |
| 7,368,889 B2 * | 5/2008 | Youm et al. | 318/801 |
| 7,372,227 B2 * | 5/2008 | Rainer et al. | 318/375 |
| 7,479,756 B2 * | 1/2009 | Kasunich et al. | 318/732 |
| 7,498,756 B2 * | 3/2009 | Oechsle | 318/371 |
| 7,498,761 B2 * | 3/2009 | Iwashita et al. | 318/727 |
| 7,545,163 B2 * | 6/2009 | Disser | 324/765.01 |
| 7,701,678 B2 | 4/2010 | Dooley | |
| 7,764,029 B2 * | 7/2010 | Buente et al. | 318/105 |
| 8,049,455 B2 * | 11/2011 | Kitanaka | 318/563 |
| 8,054,015 B2 * | 11/2011 | Iwashita et al. | 318/376 |
| 8,076,878 B2 * | 12/2011 | Hahle et al. | 318/376 |
| 8,148,925 B2 * | 4/2012 | Jobard et al. | 318/376 |
| 8,159,175 B2 * | 4/2012 | Limor | 318/656 |
| 8,207,700 B2 * | 6/2012 | Syrman et al. | 318/807 |
| 8,232,752 B2 * | 7/2012 | Kezobo et al. | 318/400.06 |
| 8,528,689 B2 * | 9/2013 | Uryu | 180/446 |
| 8,544,593 B2 * | 10/2013 | Uryu | 180/443 |
| 8,575,885 B2 * | 11/2013 | Okumatsu | 318/801 |
| 8,604,733 B2 * | 12/2013 | Liegeois et al. | 318/400.29 |
| 2004/0145337 A1 * | 7/2004 | Morishita | 318/801 |
| 2004/0160208 A1 * | 8/2004 | Youm et al. | 318/801 |
| 2004/0162696 A1 * | 8/2004 | Kumar | 702/132 |
| 2004/0207351 A1 * | 10/2004 | Hahn et al. | 318/379 |
| 2004/0227479 A1 * | 11/2004 | Youm | 318/375 |
| 2005/0018371 A1 * | 1/2005 | Mladenik et al. | 361/78 |
| 2005/0052145 A1 * | 3/2005 | Carrier et al. | 318/381 |
| 2005/0195545 A1 * | 9/2005 | Mladenik et al. | 361/93.1 |
| 2005/0281065 A1 * | 12/2005 | Nojima | 363/98 |
| 2007/0008741 A1 * | 1/2007 | Al-Khayat et al. | 363/16 |
| 2007/0090783 A1 * | 4/2007 | Rainer et al. | 318/703 |
| 2007/0159180 A1 * | 7/2007 | Bay et al. | 324/522 |
| 2007/0176573 A1 * | 8/2007 | Iwashita et al. | 318/723 |
| 2007/0205798 A1 * | 9/2007 | Disser | 324/772 |
| 2007/0291426 A1 * | 12/2007 | Kasunich et al. | 361/33 |
| 2008/0129234 A1 * | 6/2008 | Buente et al. | 318/280 |
| 2008/0303458 A1 * | 12/2008 | Galbiati | 318/5 |
| 2009/0174349 A1 * | 7/2009 | Iwashita et al. | 318/400.06 |
| 2009/0309536 A1 * | 12/2009 | Limor | 318/813 |
| 2010/0079093 A1 * | 4/2010 | Kitanaka | 318/400.3 |
| 2011/0181219 A1 * | 7/2011 | Liegeois et al. | 318/400.29 |
| 2011/0298404 A1 * | 12/2011 | Okumatsu | 318/400.06 |
| 2011/0310644 A1 * | 12/2011 | Ogura et al. | 363/55 |
| 2011/0315469 A1 * | 12/2011 | Uryu | 180/443 |
| 2011/0315470 A1 * | 12/2011 | Uryu | 180/446 |
| 2011/0316466 A1 * | 12/2011 | Uryu | 318/490 |
| 2012/0146567 A1 * | 6/2012 | Iwaji et al. | 318/504 |
| 2012/0217918 A1 * | 8/2012 | Januschevski et al. | 318/400.27 |
| 2012/0229068 A1 * | 9/2012 | Januschevski et al. | 318/501 |
| 2012/0313564 A1 * | 12/2012 | Guitard et al. | 318/400.21 |
| 2013/0169288 A1 * | 7/2013 | Choi | 324/537 |
| 2013/0271056 A1 * | 10/2013 | Bunte et al. | 318/503 |
| 2013/0285584 A1 * | 10/2013 | Kim et al. | 318/400.21 |

OTHER PUBLICATIONS

Reimert; Protective relaying for power generation systems; Taylor & Francis Group; Boca Raton, FL, 2006; pp. 201-220.

Vladimir; "Simple Very High-Speed Overcurrent Protection Relay"; Israel Electric Corp. [Online] 2006.

XE2—DC current relay for loss of excitation protection; http://search.woodward.com/PDF/IC/DOK-TD-XE2E.pdf (accessed Sep. 22, 2010).

* cited by examiner

ELECTRIC MACHINE ASSEMBLY WITH FAIL-SAFE ARRANGEMENT

TECHNICAL FIELD

The disclosure relates generally to permanent magnet electric machines, and more particularly to fail-safe devices, systems and methods for permanent magnet machines.

BACKGROUND OF THE ART

Permanent magnet electric motors/generators (i.e. machines) are used in various applications including as starters/generators coupled to gas turbine engines for aerospace applications. Most permanent magnet machines are "impedance limited" which means that the windings are configured to have high impedance (inductive reactance) to prevent excessively large AC currents from flowing through windings of such machines in the event of a short circuit failure in circuitry connected to or associated with the operation of such machines.

A potential failure mode includes the possibility of DC current being driven into windings of a machine during operation as a motor and/or as a generator. Such flow of DC current into the windings could significantly reduce the protective impedance limit of the machine by saturating protective soft magnetic components. Consequently, such flow of DC current into the windings could tend to stop (e.g. brake) the machine during operation and potentially cause excessive heating. During operation as a generator, a flow of DC current into the windings could cause excessively large AC currents to be output from the machine into one or more low impedance loads connected to the machine and thereby cause a cascading failure.

Improvement in the fail-safe operation of electric machines is therefore desirable.

SUMMARY

The disclosure describes electric machines, and in particular fail-safe systems, devices, and processes for permanent magnet machines.

For example, in one aspect, the disclosure provides an electric machine assembly with fail-safe arrangement. The assembly may comprise:
  a stator including a plurality of windings and a cooperating rotor including at least one permanent magnet;
  a detector configured to detect DC current in at least one of the windings of the stator; and
  a bypass circuit configured to be activated upon detection of the DC current by the detector and configured to prevent at least some of the DC current from flowing into the at least one of the windings of the stator.

In another aspect, the disclosure provides an electric machine for use with a gas turbine engine, the assembly may comprise:
  a stator including a plurality of phase windings and a cooperating rotor including at least one permanent magnet;
  a detector configured to detect a failure of a bridge connected to the phase windings via line connections; and
  a normally open circuit configured to short-circuit the line connections upon detection of the failure by the detector.

In a further aspect, the disclosure provides a method for controlling a permanent magnet machine in the event of a failure of a bridge associated with the machine, wherein the machine comprises a stator including a plurality of phase windings and a cooperating rotor including at least one permanent magnet. The method may comprise:
  detecting the failure of the bridge; and
  establishing a short circuit between line connections of the phase windings.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION OF EMBODIMENTS

Various aspects of embodiments of the disclosure are described through reference to the drawings.

The following description relates to fail-safe arrangement(s) of a polyphase (e.g. 3-phase) permanent magnet electric machines and may be suited for use, for example, with machine configurations such as those described in the applicant's U.S. Pat. Nos. 6,965,183; 7,262,539; 7,288,910 and 7,443,642, the entire contents of which are incorporated herein by reference.

Systems, devices and methods described herein may also be used with various forms of permanent magnet machines including machines which are "impedance limited" whereby the windings have a sufficiently high impedance (inductive reactance) to prevent excessively large AC currents from flowing through the windings. It will also be understood by those skilled in the relevant arts that systems and methods according to the disclosure herein may be used in conjunction with machines having either "inside rotor", "outside rotor" or axial gap configurations.

Figure 1A:
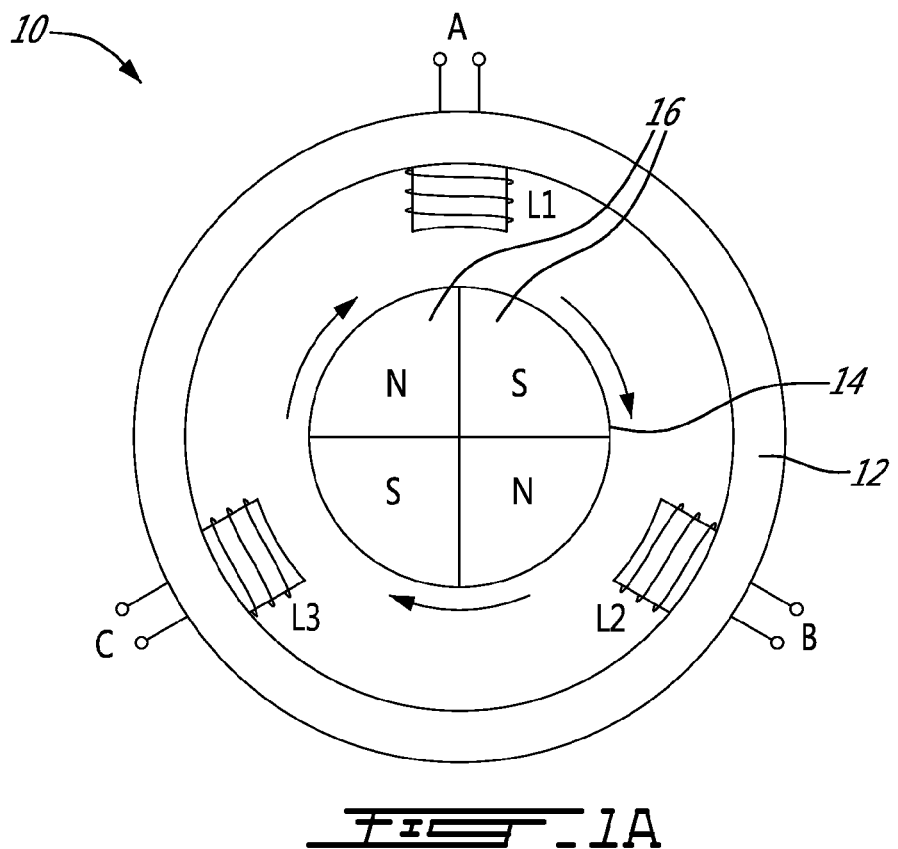
FIGS. 1A and 1B are partial schematic representations of a 3-phase permanent magnet electric machine.

FIG. 1A shows a partial schematic representation of a 3-phase (e.g. A, B and C) permanent magnet electric machine generally shown at 10. It is to be understood that electric machine 10 may be operated either as a motor or as a generator. For example, machine 10 may be used as a starter/generator coupled to a gas turbine engine (not shown) for an aircraft application. Machine 10 may comprise stator 12 including a plurality of windings L1, L2 and L3 and a cooperating rotor 14 including one or more permanent magnets 16. Machine 10 may be impedance limited. Accordingly, windings L1, L2 and L3 may have sufficient inductance resulting in sufficient inductive reactance to provide a protective impedance limit for machine 10. The protective impedance may limit AC current being output from machine 10 during operation as a generator in the event of a failure such as a short circuit fault in circuitry connected to or associated with the operation of machine 10.

Figure 1B:
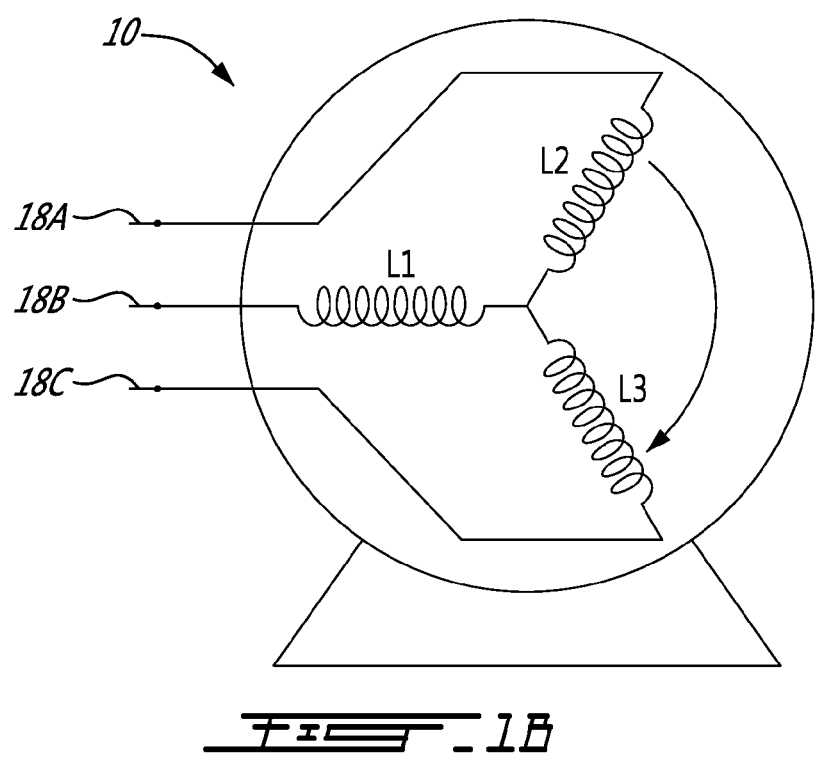

FIG. 1B shows a partial schematic representation of electric machine 10 where windings L1, L2 and L3 are arranged in a WYE configuration (i.e. schematically arranged similar to the letter "Y"). Windings L1, L2 and L3 may be connected to one or more power loads and/or power sources via line connections 18A, 18B and 18C.

Figure 2:
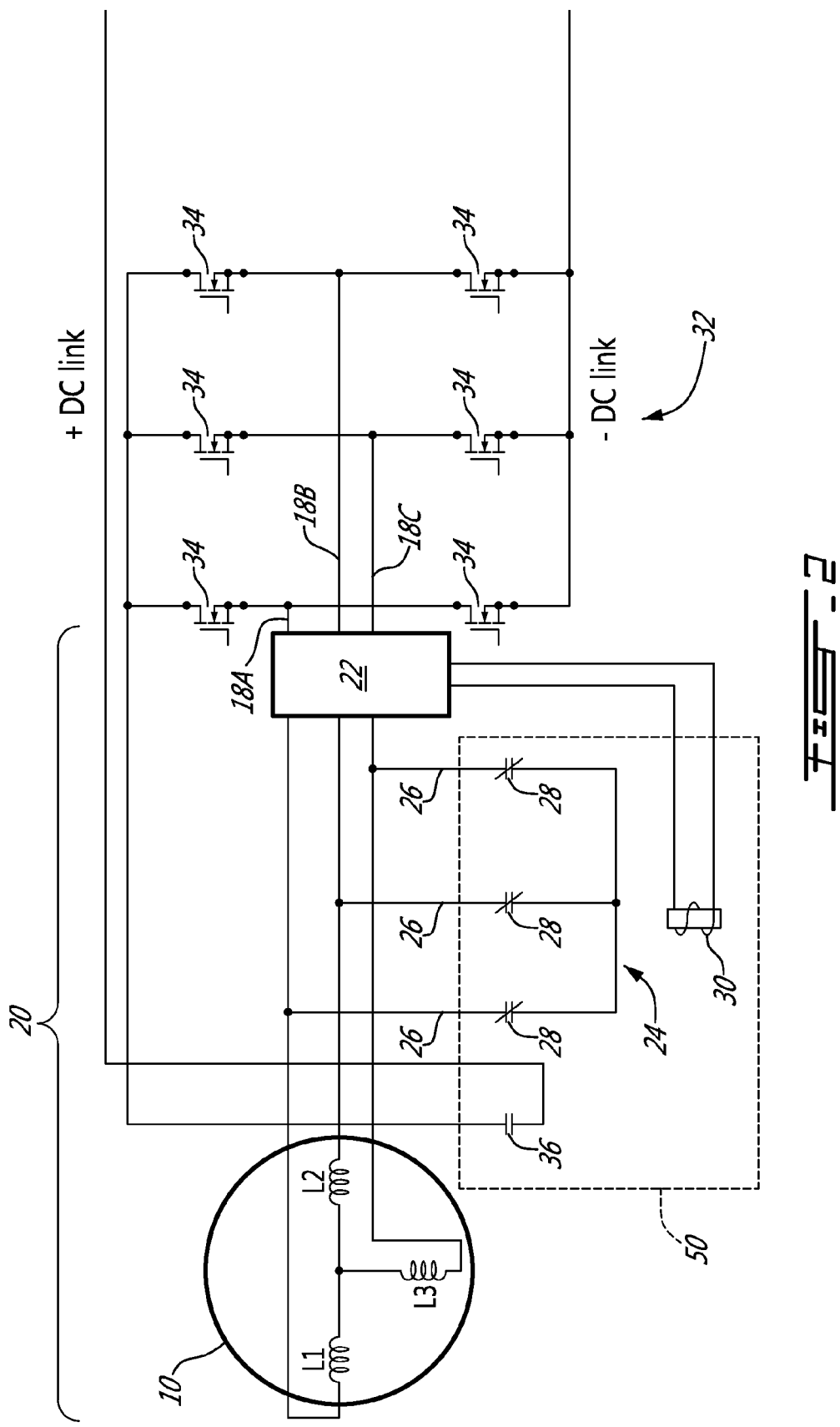
FIG. 2 is a schematic representation of an electric machine assembly, according to a first embodiment, connected to a MOSFET bridge.

FIG. 2 shows a schematic representation of an electric machine assembly 20 including a fail-safe arrangement 50. Assembly 20 may include a machine 10 such as that of FIG. 1, one or more detector(s) 22, and failsafe arrangement(s) 50, which may comprise bypass circuit(s) 24 and optionally one or more switching device(s) 30. Detector(s) 22 may be configured to detect DC current in at least one of line connections 18a, 18B and 18C. Fail-safe device(s) 50 may be configured to be activated upon detections of DC current by detector(s) 22 and to prevent at least some of the DC current from flowing into at least one of the windings L1, L2 and L3 of stator 12.

Bypass circuit(s) 24 may be biased or otherwise configured as normally-open and, upon activation (e.g. closure), may short-circuit line connections 18A, 18B and 18C of windings L1, L2 and L3. Accordingly, bypass circuit(s) 24 may comprise conductor(s) 26 and normally open contactor(s) 28, coupled to switching device(s) 30. Conductor(s) 26 may be configured to short-circuit line connections 18A, 18B and 18C to each other upon the closing of contactor(s) 28. Normally-open contactor(s) 28 may be closed by switching device(s) 30. As shown in FIG. 2, a plurality of normally-open contactors 28 may be simultaneously closed by the action of a single common switching device 30. Accordingly, a plurality of normally-open contactors 28 may be closed simultaneously by a single mechanical action.

Switching device(s) 30 may, for example, include one or more solenoid switches configured to simultaneously close a plurality of normally-open contactors 28. Switching device(s) 30 may be actuated upon detection of DC current in at least one of line connections 18A, 18B and 18C by detector(s) 22. Detector(s) 22 may be configured to provide a signal useful in the actuation of switching device(s) 30 and/or detector(s) 22 may be configured to directly cause switching device(s) 30 to be actuated.

Electric machine 10 may be connected to one or more loads and/or DC power sources such as one or more batteries for example via multi-phase bridge 32. Bridge 32 may include switching element(s) 34. Switching element(s) 34 may comprise metal-oxide-semiconductor field-effect transistor(s) (MOSFET) or other suitable types switching elements. Bridge 32 may be used to commutated DC current from one or more batteries, for example, through windings L1, L2 and L3 when machine 10 is operated as a motor. Alternatively, bridge 32 may be used to rectify AC current output from machine 10 when machine 10 is operated as a generator. Machine 10 may include a brushless DC (BLDC) motor and suitable control circuitry (not shown) may be used to control the operation of switching element(s) 34 in order to, for example, commutate current through windings L1, L2 and L3 for driving machine 10, or, rectify current being output by windings L1, L2 and L3 when machine 10 is operated as a generator.

Assemblies 20, 50 may further include normally-closed contactor(s) 36 which may be used to disconnect the one or more loads and/or DC power sources from electric machine assembly 20. Accordingly, normally-closed contactor(s) 36 may be associated with a rectified output of machine assembly 20 and/or an input current to the machine assembly 20. Normally-closed contactor(s) 36 may also be opened via actuation of common switching device 30. Accordingly, normally-closed contactor(s) 36 may be opened upon detection of DC current by detector 22 at the same time as normally-open contactor(s) 28 are being closed by the actuation of common switching device 30. Hence, normally-closed contactor(s) 36 may be opened and normally-open contactor(s) 28 may be closed simultaneously by a single mechanical action of common switching device 30.

Figure 3:
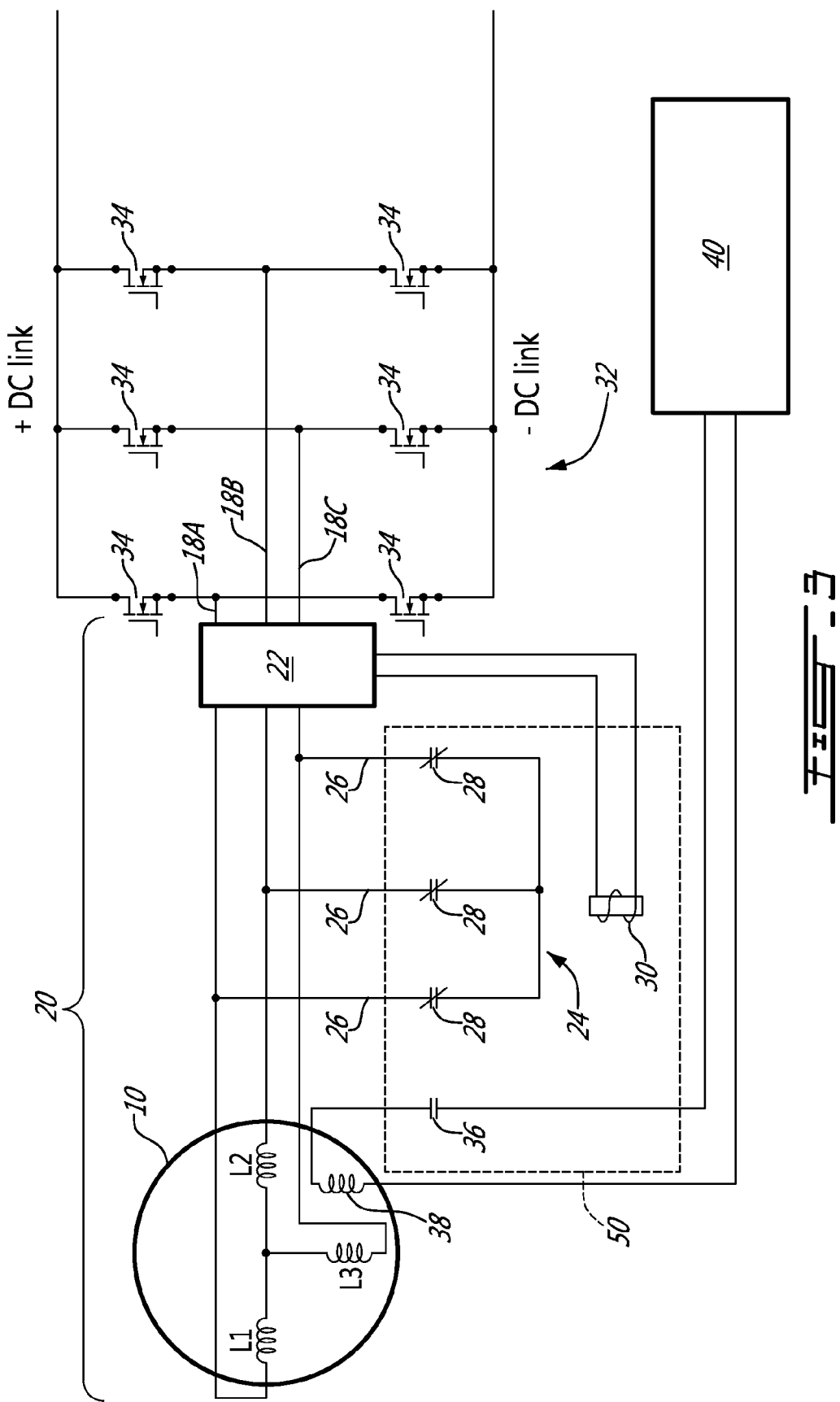
FIG. 3 is a schematic representation of an electric machine assembly, according to a second embodiment, connected to a MOSFET bridge.

FIG. 3 shows a schematic representation of an electric machine assembly 20 with a fail-safe arrangement 50 according to another embodiment. In this embodiment, electric machine 10 may comprise control coil(s) 38 for controlling a magnetic saturation level of a stator 12 (see, e.g., FIG. 1). Accordingly, control coil(s) 38 may be disposed in stator 12 and used to regulate an electrical output of machine 10. For example, control coil(s) 38 may be used to regulate output voltage(s) and current(s) from one or more of windings L1, L2 and L3. Control coil(s) 38 may be, for example, of the type disclosed in U.S. Pat. No. 6,965,183. Current through control coil(s) 38 may be controlled and/or provided by and/or via control coil driver circuit(s) 40. In such examples, normally-closed contactor(s) 36 may be configured to cooperate with control coil(s) 38 of stator 12 and may be used to interrupt current from being delivered to control coil(s) 38.

Figure 4:
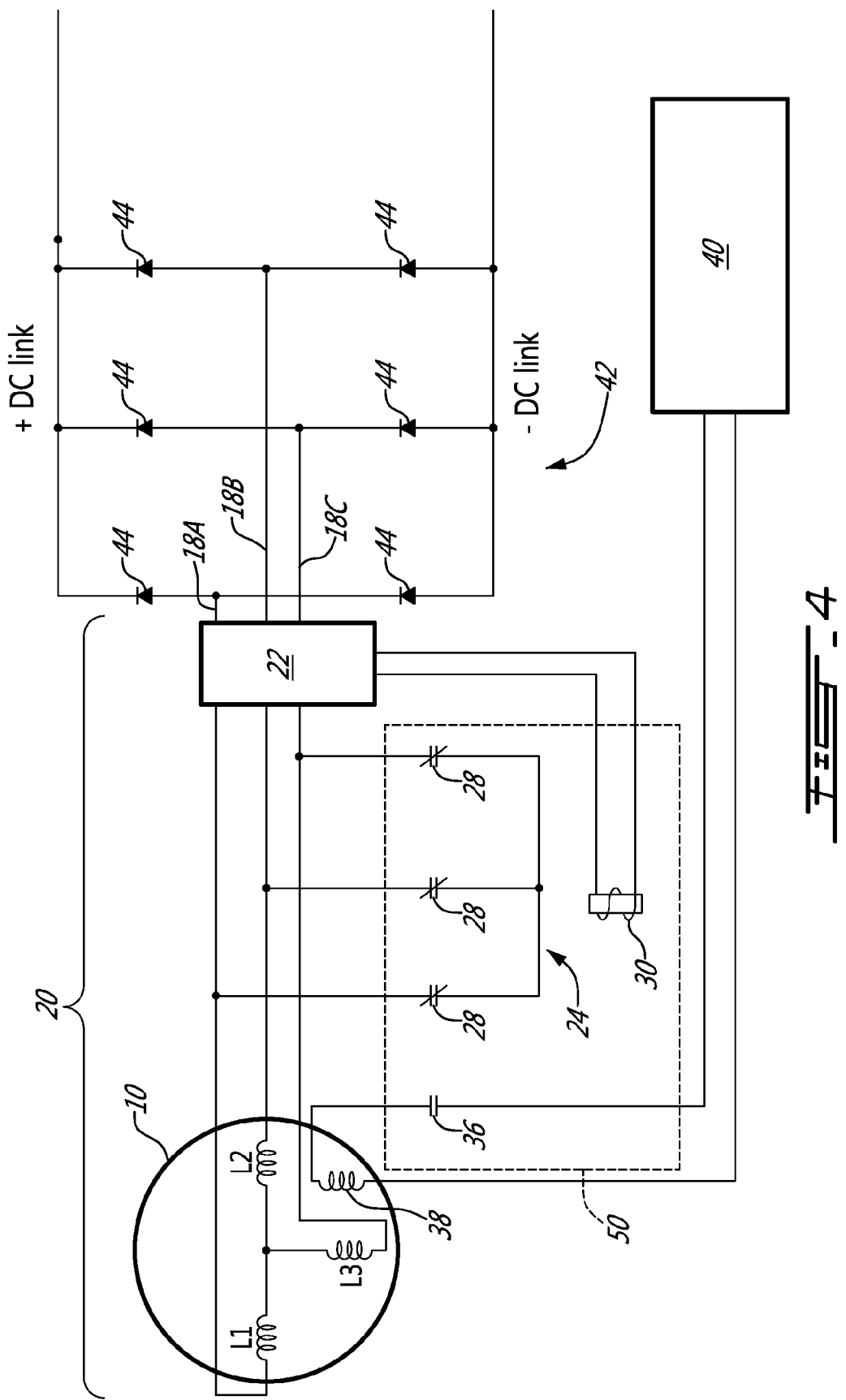
FIG. 4 is a schematic representation of the electric machine assembly of FIG. 3 connected to a diode bridge.

FIG. 4 shows a schematic representation of the electric machine assembly 20 of FIG. 3 connected to a bridge 42. Bridge 42 may for example be used to rectify AC current output from machine 10 when machine 10 is operated as a generator. Bridge 42 may comprise a plurality of diodes 44.

During operation, an electric machine 10 may be operated as a motor or as a generator. When operated as a motor, a machine 10 may be powered by one or more sources of DC current such as one or more batteries, for example, and the DC current may be commutated through windings L1, L2 and L3 via MOSFET bridge 32 according to conventional or other methods. When operated as a generator, output AC current from windings L1, L2 and L3 may be rectified prior to being delivered to loads. Rectification of current output from windings L1, L2 and L3 may be conducted using, for example, MOSFET bridge 32 via proper control of switching elements 34 (e.g. synchronous rectification) or diode bridge 42. Alternatively, bridge 32 may comprise switching elements 34 (e.g. MOSFETs) each having an intrinsic body diode (not shown) and rectification may be conducted using the intrinsic body diodes in bridge 32 instead of having to switch switching elements 34 of bridge 32. Accordingly, bridge 32 may be configured as a bi-directional power converter. For the embodiment(s) shown in FIGS. 3 and 4, output of electric machine 10 may be regulated using control coil(s) 38 by varying a magnetic saturation level within stator 12.

Whether machine 10 is operated as a motor or as a generator, a failure mode may exist if the machine lacks suitable fail-safe arrangement, wherein DC current may be caused to flow into the windings of such machine. For example, when a machine 10 is operated as a motor, a failure of one or more switching elements such as 34 (e.g. stuck in a closed position, short circuit) of a MOSFET bridge such as 32 may cause DC current to flow from a DC source directly into at least one of windings of the machine. Consequently, such flow of DC current into the windings could tend to stop (brake) the machine and potentially cause excessive heating of the rotor. When operated as a generator, a failure of one or more switching elements 34 (e.g. stuck in a closed position, short circuit) of MOSFET bridge 32 or a failure of one or more diodes such as 44 (e.g. short circuit) of a diode bridge such as 42 may cause DC current to flow back into one or more of windings of the machine. Even though the machine may be "impedance limited" meaning that its windings may have a sufficiently high inductive reactance to prevent excessively large AC currents from being output from the machine, a flow of DC current back into its windings may significantly reduce the protective impedance limit the machine. Since the flow of DC current may not be affected by the inductance of the windings, DC current would be permitted to flow substantially unrestricted into the windings and potentially cause saturation of a stator of the machine which would thereby reduce the protective impedance designed into the machine. Consequently, the loss of protective impedance could potentially cause large AC currents being output from the machine and to flow into low impedance load(s)/circuit(s) connected to the machine and thereby cause a cascading failure.

A fail-safe arrangement incorporated into an assembly 20 may provide a method of controlling a permanent magnet machine 10 in the event of a failure of bridge 32, 42 associated with the machine 10. Accordingly, machine assembly 20 may be used to prevent or at least reduce the amount of DC current that may flow into windings L1, L2 and L3 in the event of such failure. Accordingly, detector 22 may be configured to detect failure of bridge 32, 42 and cause normally-open bypass circuit(s) 24 to be activated (e.g. closed) to thereby prevent or at least reduce the amount of DC current that may flow into windings L1, L2 and L3. For example, a detector 22 may be configured to detect DC current, such as for example a non-zero average current over a predetermined period of time in one or more of windings L1, L2 and L3 and/or line connections 18A, 18B and 18C. The predetermined period of time during which a non-zero average (e.g. DC) current may be detected may be selected so that the detection is indicative of a failure in bridge 32, 42 (e.g. a rectification failure during operation as a generator or commutation failure during operation as a motor).

Upon detection of DC current by detector 22, switching device 30 may be activated to close normally-open contactor(s) 28. The closure of normally-open contactor(s) 28 may consequently establish a short-circuit between line connections 18A, 18B and 18C via conductor(s) 26. The short circuit(s) produced by conductor(s) 26 may provide a low resistance path through which DC current may directed instead of through windings L1, L2 and L3. By diverting at least a portion of the DC current into bypass circuit(s) 24 instead of through windings L1, L2 and L3, the protective inductance of windings L1, L2 and L3 may be substantially or at least partially maintained.

A short circuit between line connections 18A, 18B and 18C may also be established, for example, by switching the three switching elements 34 of bridge 32 which are connected to the −DC link (e.g. three lower switching elements 34 in FIGS. 2 and 3) to an ON state. However, this option may not be available if there is no power available for controlling the particular switching elements 34 or if one of the switching elements 34 has failed and is causing the DC current through windings L1, L2 and L3 in the first place. Accordingly, it may be desirable to instead rely on another means such as, for example, fail-safe arrangement 50 to establish a short circuit between line connections 18A, 18B and 18C.

Bypass circuit(s) 24 may also create a short circuit for the AC current being generated in windings L1, L2 and L3 when machine 10 is operated as a generator and thereby eliminate the AC supply to bridge 32, 42 and thus remove the source of power to any load(s)/circuit(s) connected to machine 10. Due to the protective impedance of windings L1, L2 and L3 being at least partially maintained, the magnitude of the AC current generated in windings L1, L2 and L3 may still be at least partially limited by the protective impedance of windings L1, L2 and L3.

In addition to the activation of bypass circuit(s) 24, any load(s) and/or power source(s) may also be disconnected from machine 10 upon the detection of a failure of bridge 32, 42. As shown in FIG. 2 for example, load(s) and/or power source(s) may be disconnected from machine 10 by the opening of normally-closed contactor(s) 36. Normally-closed contactor(s) 36 may be opened by the activation of common switching device(s) 30 and at the same time as the closing of normally-open contactor(s) 28 occurs. Common switching device 30 may include a solenoid switch mechanically coupled to the normally-open contactor(s) 28 and also to normally-closed contactor(s) 36 so that simultaneous closing of normally-open contactor(s) 28 and opening of normally-closed contactor(s) 36 may be achieved through a single mechanical action. The use of normally-open contactor(s) 28 in bypass circuit(s) 24 may result in contactor(s) 28 only carrying current in the event of a failure and therefore may lead to a relatively long contact life.

In embodiments in which electric machine 10 includes control coil(s) 38 as shown in FIGS. 3 and 4, current through control coil(s) 38 may also be interrupted in the event of a failure of bridge 32, 42. Control coil(s) 38 may be disconnected from driver circuit 40 by the opening of normally-closed contactor(s) 36 shown in FIGS. 3 and 4. As described above, normally-closed contactor(s) 36 may be opened by the activation of common switching device(s) 30 and at the same time as the closing of normally-open contactor(s) 28 through a single action of switching device 30.

The above descriptions are meant to be exemplary only. Those skilled in the relevant arts will recognize that changes may be made to the embodiments described without departing from the scope of the present disclosure. For example, systems and methods suitable for use in implementing the disclosure do not specifically require 3-phase brushless DC motors, but may be used with all types of permanent magnet motors. A 3-phase motor may be preferred because in many cases it simplifies the associated electronics by allowing the use of commercially-available circuits designed to be used to detect a bridge failure.

Methods and systems according to the disclosure may also be used in conjunction with machines serving as starter motors (not shown) driving a shaft for, as an example, starting a gas turbine engine (not shown).

It will also be understood by those skilled in the relevant arts that systems and methods according to the disclosure herein may be used in conjunction with machines having either "inside rotor" or "outside rotor" and axial gap configurations. Still other modifications which fall within the scope of the described subject matter will be apparent to those skilled in the art, in light of a review of this disclosure, and such modifications are intended to fall within the appended claims.

What is claimed is:

1. An electric machine assembly with fail-safe arrangement, the assembly comprising:
    a stator including a plurality of windings and a cooperating rotor including at least one permanent magnet;
    a multi-phase bridge connected to the phase windings;
    a detector configured to detect a failure in the multi-phase bridge by detecting a presence of DC current in at least one of the windings of the stator during operation of the electric machine; and
    a bypass circuit configured to be activated by a switching device upon detection of the failure in the multi-phase bridge by the detector and configured to prevent at least some of the DC current from flowing into the at least one of the windings of the stator.

2. The assembly as defined in claim 1, wherein the bypass circuit is configured to short-circuit line connections of the windings of the stator.

3. The assembly as defined in claim 1, wherein the bypass circuit comprises a normally-open contactor.

4. The assembly as defined in claim 1, wherein the bypass circuit includes a plurality of normally-open contactors configured to short-circuit line connections of the windings of the stator upon closing of the normally-open contactors.

5. The assembly as defined in claim 4, wherein the normally-open contactors are configured to be closed by the switching device.

6. The assembly as defined in claim 5, wherein the switching device is configured to open a normally-closed contactor associated with at least one of a rectified output of the machine assembly and an input current to the machine assembly.

7. The assembly as defined in claim 5, wherein the switching device is configured to open a normally-closed contactor associated with a control coil of the stator.

8. The assembly as defined in claim 4, wherein the normally-open contactors are configured to be closed simultaneously by a single action.

9. The assembly as defined in claim 1, wherein the stator includes three windings and the bypass circuit includes a corresponding number of normally-open contactors configured to short-circuit line connections of the windings to each other.

10. An electric machine assembly for use with a gas turbine engine, the assembly comprising:
   a stator including a plurality of phase windings and a cooperating rotor including at least one permanent magnet;
   a detector configured to detect a failure of a bridge connected to the phase windings via line connections during operation of the electric machine, the detection of the failure of the bridge comprising a detection of a presence of DC current in one of the phase windings; and
   a bypass circuit comprising a normally-open contactor configured to be actuated by a switching device and short-circuit the line connections upon detection of the failure of the bridge by the detector.

11. The assembly as defined in claim 10, wherein the bypass circuit comprises a plurality of normally-open contactors.

12. The assembly as defined in claim 11, wherein the normally-open contactors are configured to be closed by the switching device.

13. The assembly as defined in claim 12, comprising a normally-closed contactor configured to be opened by the switching device wherein the normally-closed contactor is associated with a control coil of the stator.

14. The assembly as defined in claim 10, wherein the failure of the bridge comprises DC current flowing in a line connection of one of the phase windings.

15. A method for controlling a permanent magnet machine in the event of a failure of a bridge associated with the machine, wherein the machine comprises a stator including a plurality of phase windings and a cooperating rotor including at least one permanent magnet, the method comprising:
   detecting the failure of the bridge during operation of the permanent magnet machine where detecting the failure comprises detecting a presence of DC current in one of the phase windings; and
   upon detection of the failure of the bridge, closing a normally-open contactor by the actuation of a switching device to establish a short circuit between line connections of the phase windings.

16. The method as defined in claim 15, wherein establishing a short circuit comprises closing a plurality of normally-open contactors using a single mechanical action.

17. The method as defined in claim 16, comprising opening a normally-closed contactor using the single mechanical action wherein the normally-closed contactor is associated with a control coil of the stator.

18. The method as defined in claim 16, comprising opening a normally-closed contactor using the single mechanical action wherein the normally-closed contactor is associated with at least one of a rectified output of the machine assembly and an input current to the machine assembly.

19. The method as defined in claim 15, wherein detection of the failure comprises the detection of DC current in one of the line connections of the phase windings.

* * * * *